United States Patent
Tsai

(10) Patent No.: US 7,241,029 B2
(45) Date of Patent: Jul. 10, 2007

(54) LAMP MODULE

(75) Inventor: Wen-Wei Tsai, Miao-Li County (TW)

(73) Assignee: Coretronic Corporation, Chu-nan (TW)

( * ) Notice: Subject to any disclaimer, the term of this patent is extended or adjusted under 35 U.S.C. 154(b) by 12 days.

(21) Appl. No.: 11/324,267

(22) Filed: Jan. 4, 2006

(65) Prior Publication Data
US 2006/0232982 A1 Oct. 19, 2006

(30) Foreign Application Priority Data
Apr. 13, 2005 (TW) .............................. 94111587 A

(51) Int. Cl.
F21S 8/00 (2006.01)
(52) U.S. Cl. ...................... 362/277; 362/319; 362/372; 362/285; 353/119
(58) Field of Classification Search ................ 362/640, 362/647, 652, 655, 656, 254, 285, 287, 277, 362/282, 427, 372, 368; 353/119
See application file for complete search history.

(56) References Cited
U.S. PATENT DOCUMENTS
5,855,488 A * 1/1999 Heintz et al. ............... 439/310
6,345,896 B1 2/2002 Kurosawa
7,011,417 B2 * 3/2006 Kyoto et al. ................ 353/119
7,147,349 B2 * 12/2006 Kato et al. .................. 362/294
2004/0257812 A1 * 12/2004 Fujisawa ..................... 362/263

FOREIGN PATENT DOCUMENTS
TW 522284 B 3/2003

* cited by examiner

Primary Examiner—Thomas M. Sember
(74) Attorney, Agent, or Firm—Birch, Stewart, Kolasch & Birch, LLP

(57) ABSTRACT

The present invention discloses a lamp module. The lamp module includes a lamp frame for supporting a lamp and a fixing means for fixing the lamp and a reflector to the lamp frame. The fixing means includes a movable first fixing element and a movable second fixing element which both can be moved to a first position for releasing the reflector and a second position for fixing the reflector. The first fixing element includes at least one elastic element for fixing the reflector by pushing the reflector to securely keep at a static position relative to the lamp frame. The present invention provides the lamp and the reflector that can be detached from the lamp frame, thereby providing a lamp module capable of quickly and individually replacing the lamp and the reflector.

11 Claims, 6 Drawing Sheets

LAMP MODULE

FIELD OF THE INVENTION

The present invention relates to a lamp module, and more particularly to a lamp module capable of individually replacing a lamp and a reflector of the lamp module.

BACKGROUND OF THE INVENTION

Generally, a lamp used in a projector and the other corrective components can constitute a lamp module. Refer to FIG. 1, a conventional lamp module includes a lamp 10, a reflector 11, a lamp frame 12, an electrical connector 13, and cables, etc., wherein some components are not shown in FIG. 1 because of view angle. The lamp 10 and the reflector 11 of the conventional lamp module cannot be individually replaced. Accordingly, when the lamp is broken or the lifetime of lamp ends, the whole lamp module must be abandoned and then replaced with a new lamp module. However, the lifetime of the lamp is shorter than the other components of the lamp module. Thus, it is wasted that useful components such as the lamp frame 12, the electrical connector 13, and the cables must be abandoned because of a broken lamp. Although R.O.C. Publication No. 522,284, entitled "Projection Type Display Device" (the U.S. counterpart patent, U.S. Pat. No. 6,345,896 B1, entitled "Projector capable of easily replacing and efficiently cooling light source") is disclosed a projection type display device capable of easily replacing a lamp module and efficiently cooling the lamp module and capable of facilitating a reduction in the size of the display device. An exhaust fan adjacent to the lamp module is fixed to a replacement cover. When moving the replacement cover, the lamp module can be easily attached or detached. However, the mentioned prior art still can not solve the problem of waste because of replacement of the whole lamp module.

According to new environmental protection rules of Waste Electrical and Electronic Equipment Directive (WEEE) published by European Union (EU), components are repeatedly used so as to reduce waste. Throwing away the lamp module with the broken lamp and the useful components increases the waste and a maintenance charge.

SUMMARY OF THE INVENTION

It is an object of the present invention to provide a lamp module capable of individually replacing a lamp and a reflector to avoid abandoning useful components of the lamp module when the lamp is broken.

It is another object of the present invention to provide a lamp module capable of replacing a lamp and a reflector of a lamp module easily.

In an embodiment, a lamp module includes a lamp frame for supporting the lamp and a fixing means for fixing the lamp to the lamp frame in two directions. The directions are X-axis and Y-axis of a plane coordinates. The fixing means includes a movable first fixing element and a movable second fixing element which both can be moved to a first position for releasing the lamp and a second position for fixing the lamp. The first fixing element further includes at least one elastic element for providing a force to push the reflector at a static position relative to the lamp frame.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
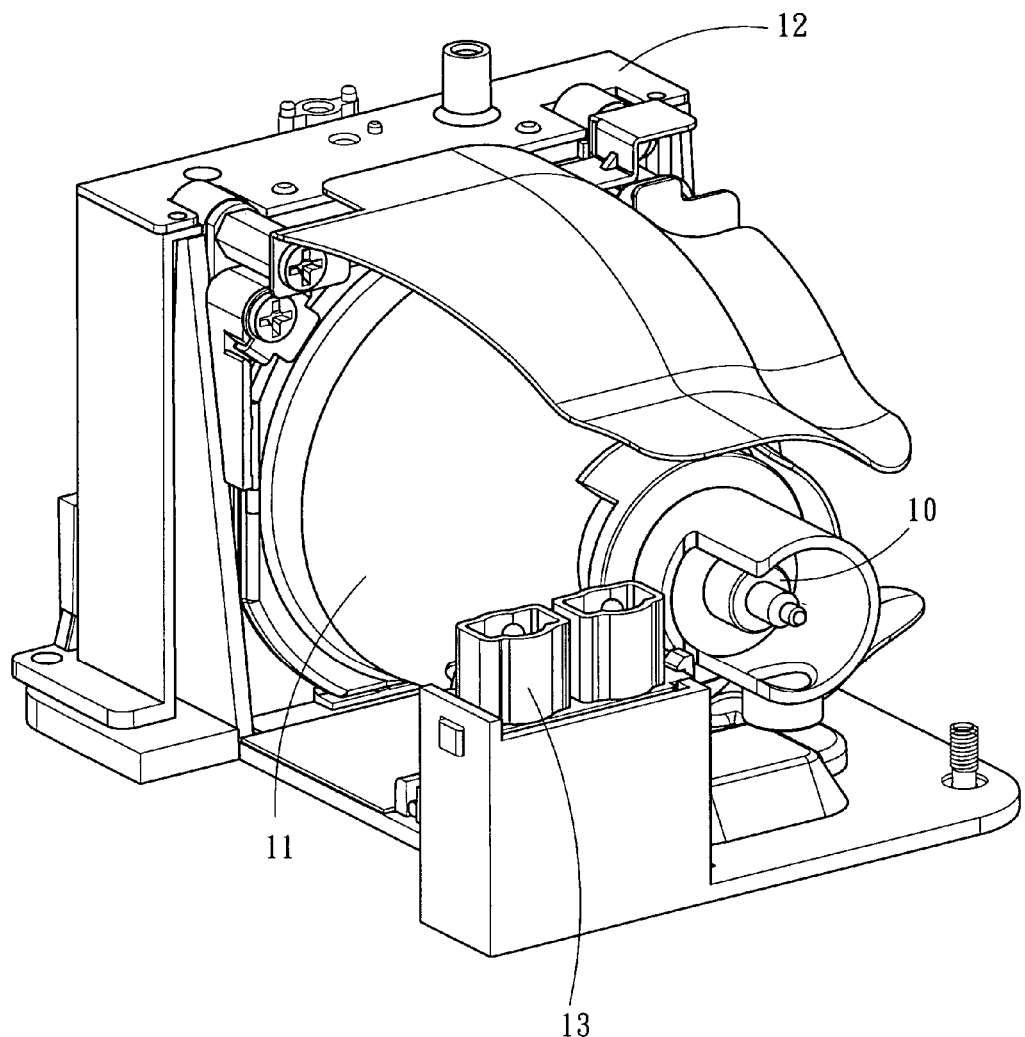
FIG. 1 is a perspective view of a conventional lamp module.
Figure 2:
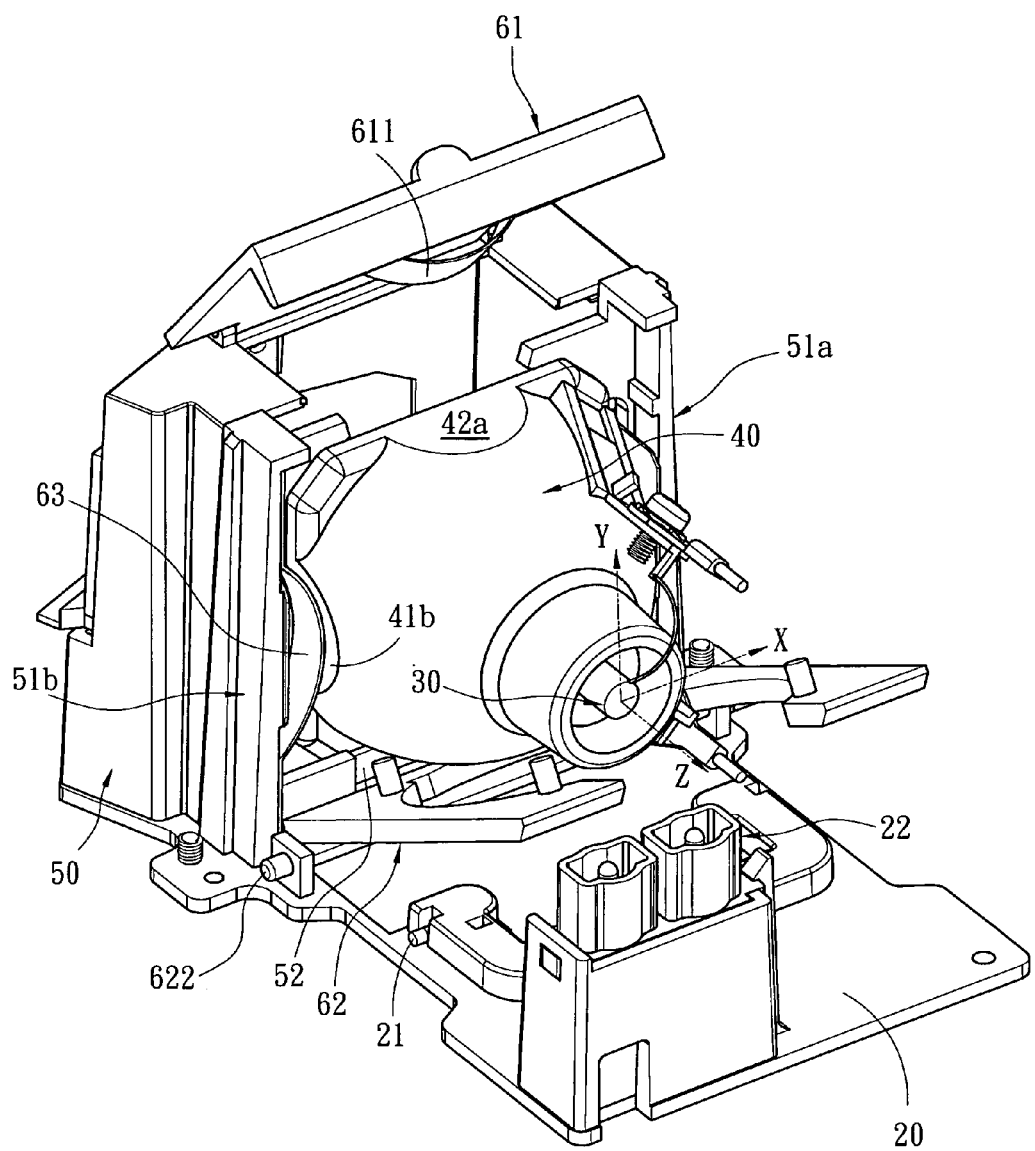
FIG. 2 is a perspective schematic view of a lamp module according to an embodiment of the present invention.
Figure 3:
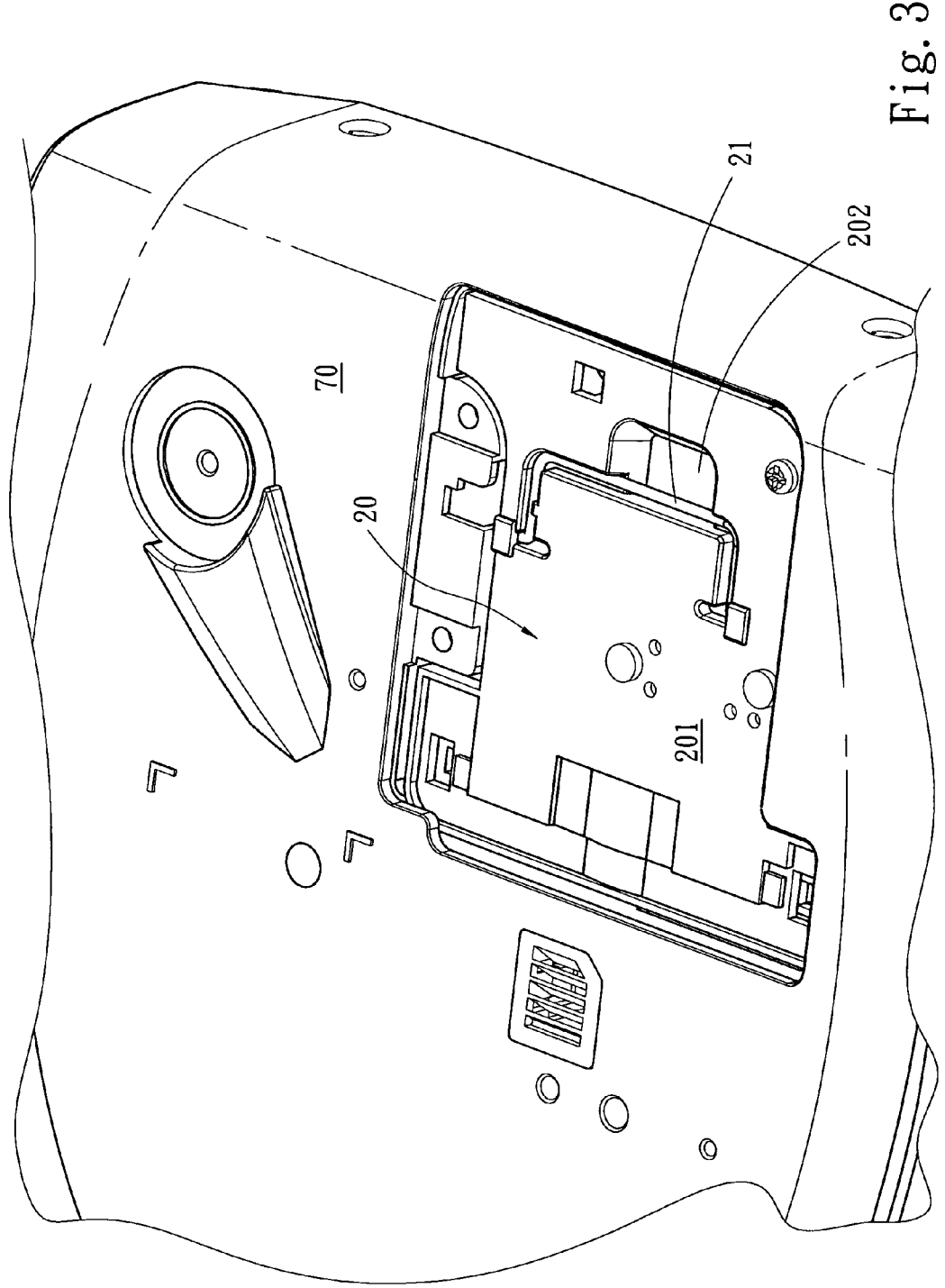
FIG. 3 is a bottom view of a lamp module according to an embodiment of the present invention.
Figure 4:
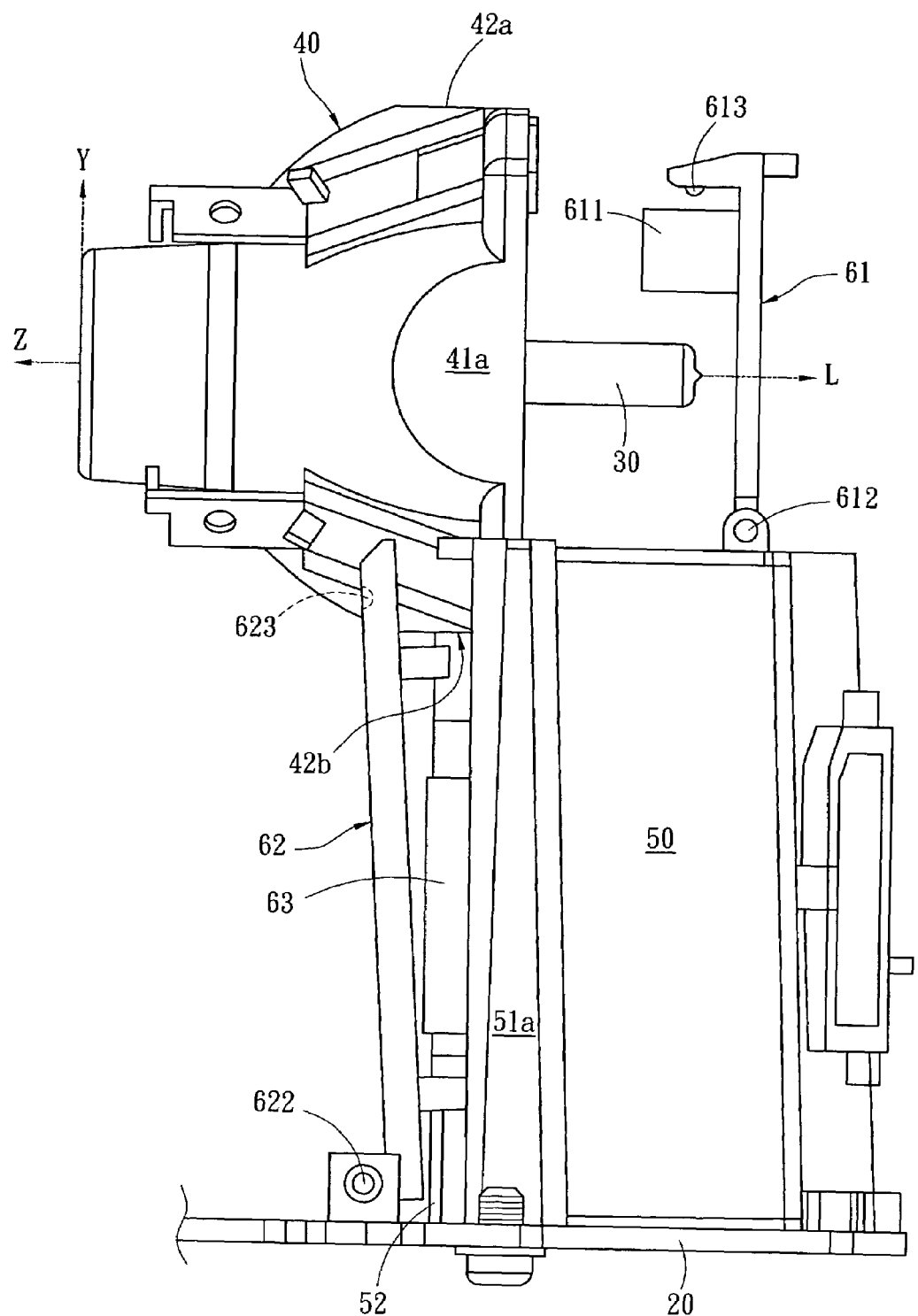
FIG. 4 is a side view of a lamp module showing a reflector at a first position according to an embodiment of the present invention.

Referring to FIGS. 2, 3, and 4, a lamp module includes a flat bottom plate 20, a pull handle 21, an electrical connector 22, a lamp 30, a reflector 40, and a lamp frame 50. The flat bottom plate 20 is supporting components of the lamp module, such as the electrical connector 22, the lamp 30, the reflector 40, and the lamp frame 50. The pull handle 21 is made of bended metal wire and pivotally mounted on a bottom surface 201 of the flat bottom plate 20. Ordinarily, the pull handle 21 is accommodated in an accommodating groove 202 of the flat bottom plate 20. The lamp module is drawn out from a projector by the pull handle 21. The electrical connector 22 is electrically connected to a power supply (not shown) via an electrical cable.

The lamp 30 is disposed in the reflector 40. The reflector 40 includes a pair of first datum sides 41a, 41b parallel to each other and a pair of second datum sides 42a, 42b parallel to each other, shown in FIGS. 2 and 4. The first datum sides 41a, 41b are symmetrically disposed with respect to an optical axis (L), and the second datum sides 41a and 41b are symmetrically disposed with respect to the optical axis (L). The lamp 30 and the reflector 40 are assembled to a correct position of the lamp module via the first and second datum sides 41a, 41b, 42a, and 42b. Thus, the light emitted from the lamp 30 can be accurately reflected by the reflector 40.

The lamp frame 50 is disposed on the flat bottom plate 20 for supporting the reflector 40 and the lamp 30, wherein the lamp frame 50 includes a fixing means for fixing the reflector 40 and the lamp 30 to the lamp frame 50 in two directions. The reflector 40 and the lamp 30 is assembled at the correct position of the lamp module by the fixing means and the lamp frame 50.

Preferably, the directions are X-axis and Y-axis of a plane coordinate. The optical axis (L) of the lamp 30 is in a direction opposite to the Z-axis of the plane coordinate. In the embodiment, a pair of side plates 51a, 51b disposed on the lamp frame 50 for fixing the reflector 40 at the correct position of the X-axis. The pair of side plates 51a, 51b extends along the Y-axis and is symmetrically disposed with respect to the optical axis (L) of the lamp 30. When the reflector 40 and the lamp 30 are assembled, the first datum sides 41a, 41b of the reflector 40 slide into a space between the side plates 51a, 51b along the direction of the Y-axis. The reflector 40 can be assuredly fixed at the correct position of the X-axis by controlling the space between the side plates 51a, 51b. The lamp frame 50 further includes a supporting element 52, which is disposed at a terminal position of a sliding route of the reflector 40 for fixing the reflector 40 at the correct position in the Y-axis.

Figure 5:
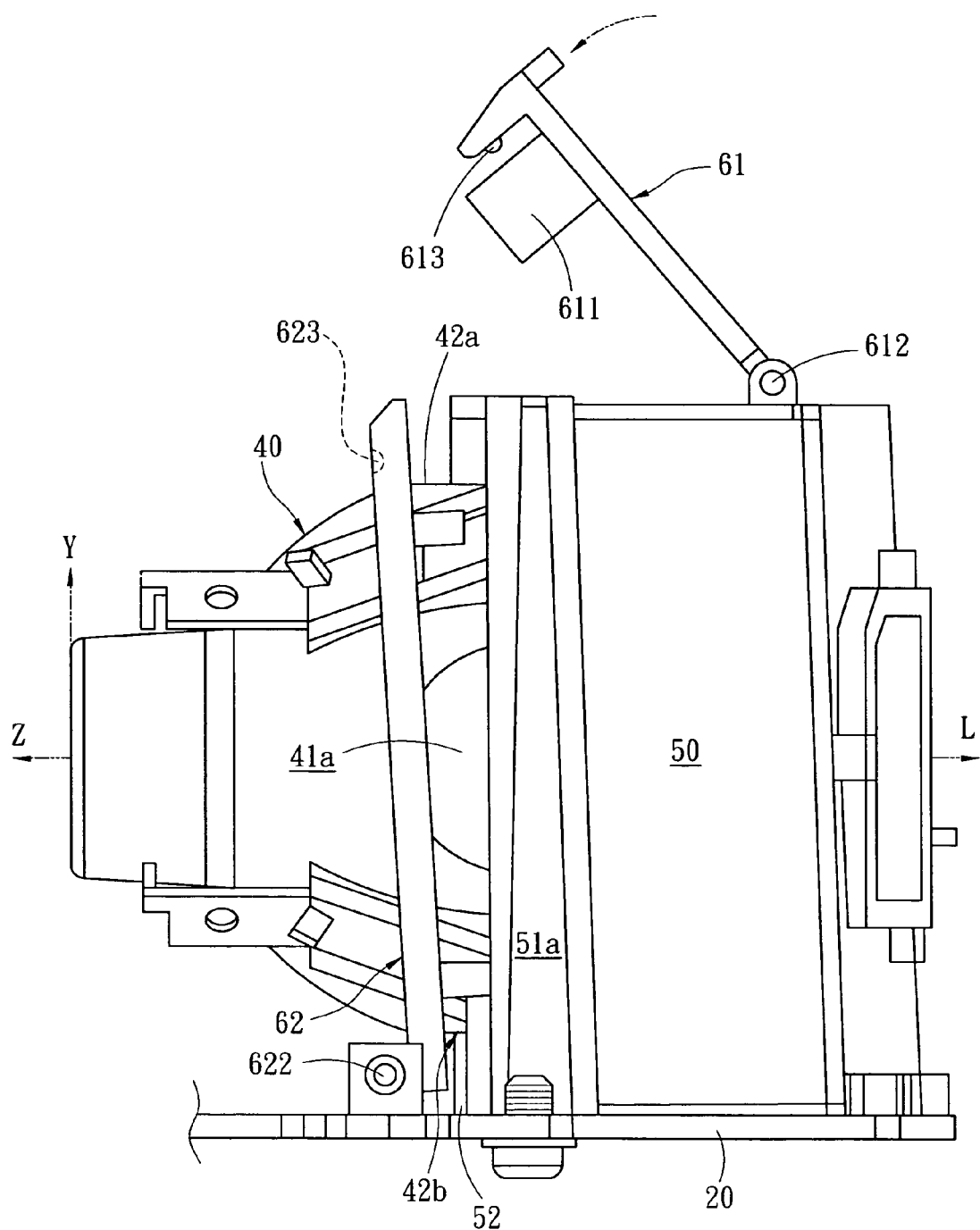
FIG. 5 is a side view of a lamp module showing a first and a second fixing element at a first position according to an embodiment of the present invention.
Figure 6:
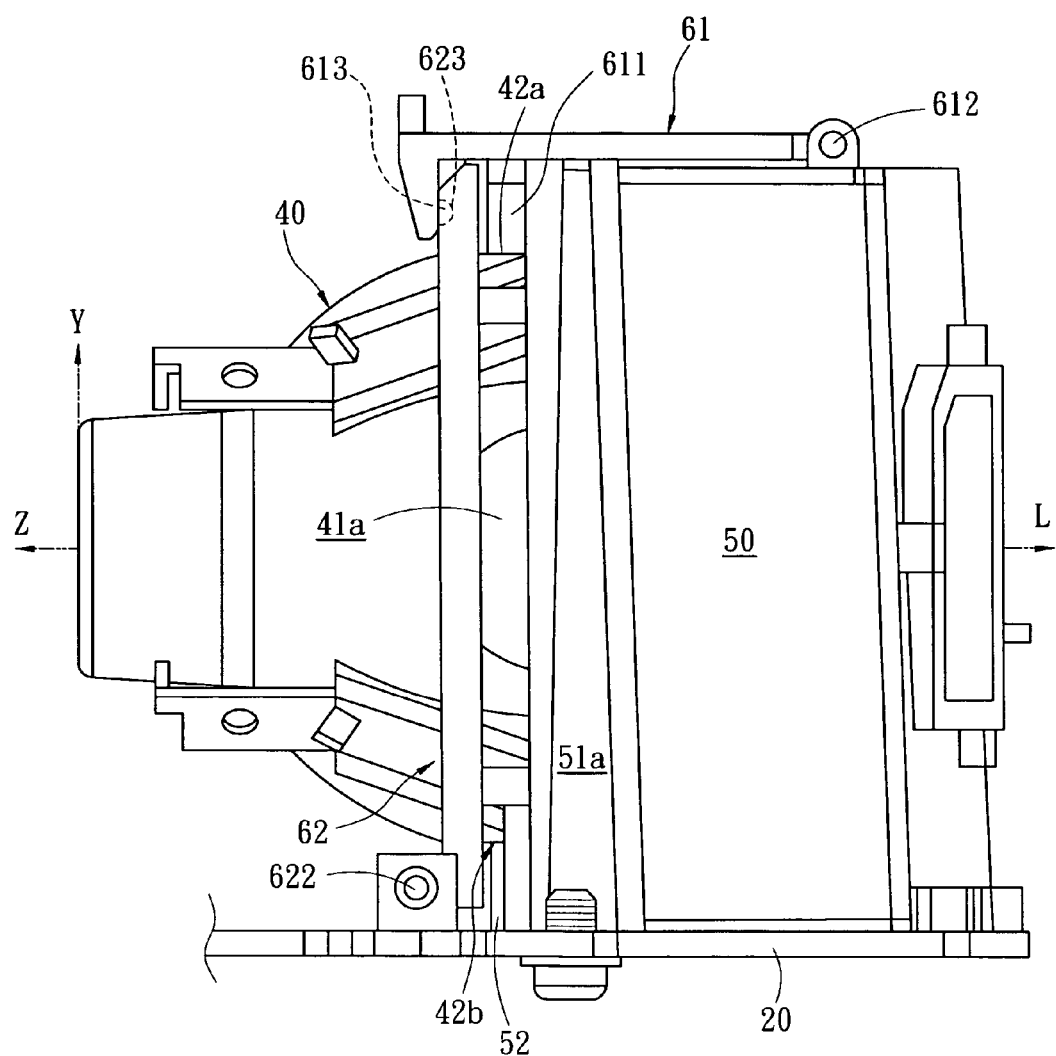
FIG. 6 is a side view of a lamp module showing a first and a second fixing element at a second position according to an embodiment of the present invention.

The fixing means includes a movable first fixing element 61 and a movable second fixing element 62. The first and second fixing elements 61, 62 can be moved to a first position for releasing the reflector 40 shown in FIGS. 4 and 5 and a second position for fixing the reflector 40 shown in FIG. 6. The second position is the correct position of the lamp module. One end of the first fixing element 61 pivots on the lamp frame 50 by a pivot 612. One end of the second fixing element 62 pivots on the flat bottom plate 20 by a pivot 622.

The first fixing element 61 further includes a first elastic element 611, which is disposed on a side of the first fixing element 61 facing the reflector 40. When the first fixing element 61 is at the second position, the first elastic element 611 can push the second datum side 41a of the reflector 40 for forcing the second datum side 41b of the reflector 40 to tightly contact the supporting element 52, and then forcing the lamp 30 and the reflector 40 to securely keep at a static position relative to the lamp frame 50. The side plate 51b is provided with a second elastic element 63 disposed on a side of the side plate 51b facing the reflector 40. The side plate 51a also can be provided with the second elastic element 63. After the reflector 40 is installed into the lamp frame 50, the second elastic element 63 forces the first datum side 41a of the reflector 40 to securely keep between the side plates 51a, 51b in the X-axis. The first elastic element 611 and second elastic element 63 are sheet-shaped springs but not limited.

The first and second fixing elements 61, 62 for fixing the lamp 30 to the lamp frame 50 are locked each other. In other words, at the second position, the second fixing element 62 can be buckled by the first fixing element 61 shown in FIG. 6. In the embodiment, the first fixing element 61 is provided with a hook 613, and the hook 613 is utilized to buckle a recess 623 of the second fixing element 62. A user simultaneously releases the first fixing element 61 and second fixing element 62 only in single operation. In other words, if the first fixing element 61 is released, simultaneously the second fixing element 62 is released.

Generally, the lamp 30 and the reflector 40 are replaced from a bottom 70 of the projector. When the lamp 30 and the reflector 40 are requested to replace, the user overturns the projector to let the bottom 70 of the projector upward for exposing out the lamp module. Then, the lamp module is taken out from the projector by the pull handle. The first fixing element 61 is firstly released, whereby the lamp 30 and the reflector 40 can be individually disassembled. Then, a new lamp and a new reflector are assembled into the lamp module. The lamp module with the new lamp and the new reflector is installed into the projector so as to finish the replacement. The present invention is not requested to abandon the useful components of the lamp module except the lamp and the reflector. Thus, the present invention conforms to the requirement of environmental protection. The present invention decreases a maintenance charge and facilitates to increase the desire of consumer for buying the product.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A lamp module comprising:
    a bottom plate;
    a lamp and a reflector, the lamp disposed in the reflector; and
    a lamp frame disposed on the bottom plate and comprising a pair of side plates and a fixing means for fixing edges of the reflector to the lamp frame, the pair of side plates being symmetrical disposed with respect to an optical axis of the lamp for the reflector sliding into a space between the side plates, and the fixing means comprising a movable first fixing element and a movable second fixing element, the first and second fixing elements being moved to a first position for releasing the reflector and a second position for fixing the reflector.

2. The lamp module according to claim 1, wherein the lamp frame comprises a supporting element disposed at a terminal position of a sliding route of the reflector for supporting the reflector at the second position.

3. The lamp module according to claim 1, wherein the first fixing element comprises a first elastic element pushing the reflector for fixing the reflector at the second position.

4. The lamp module according to claim 3, wherein the reflector comprises a pair of second datum sides parallel to each other, and the second datum sides are pushed by the first elastic element of the first fixing element for fixing the reflector at the second position.

5. The lamp module according to claim 1, further comprising a second elastic element disposed on a side of one of the side plates facing the reflector for fixing the reflector to securely keep into a space between the side plates.

6. The lamp module according to claim 5, wherein the reflector comprises a pair of first datum sides parallel to each other, and the first datum sides are sliding into the space between the side plates of the lamp frame and forced by the second elastic element for fixing the reflector to securely keep into the space.

7. The lamp module according to claim 1, wherein one end of the first fixing element pivots on the lamp frame.

8. The lamp module according to claim 1, wherein one end of the second fixing element pivots on the bottom plate.

9. The lamp module according to claim 1, wherein the second fixing element is buckled by the first fixing element at the second position.

10. The lamp module according to claim 9, wherein the first fixing element comprises a hook and the second fixing element comprises a recess, and the recess is buckled by the hook at the second position.

11. The lamp module according to claim 1, further comprising a pull handle being pivoted on a bottom surface of the bottom plate.

* * * * *